Dec. 3, 1957  W. H. BRUGGEMAN ET AL  2,815,277
METHOD FOR REMOVING SODIUM OXIDE FROM LIQUID SODIUM
Original Filed Sept. 2, 1953  3 Sheets-Sheet 1

INVENTORS.
WARREN H. BRUGGEMAN
BY BERTRAM G. VOORHEES

ATTORNEY.

INVENTORS.
WARREN H. BRUGGEMAN
BERTRAM G. VOORHEES
BY
ATTORNEY.

INVENTORS.
WARREN H. BRUGGEMAN
BY BERTRAM G. VOORHEES

ATTORNEY.

2,815,277

METHOD FOR REMOVING SODIUM OXIDE FROM LIQUID SODIUM

Warren H. Bruggeman, Watervliet, and Bertram G. Voorhees, Schenectady, N. Y., assignors to the United States of America as represented by the United States Atomic Energy Commission Original application September 2, 1953, Serial No. 378,184, now Patent No. 2,745,552, dated May 15, 1956. Divided and this application December 29, 1955, Serial No. 556,375

4 Claims. (Cl. 75—66)

The present invention relates to a method for removing sodium oxide from liquid sodium and is a division of our copending application Serial Number 378,184, filed September 2, 1953, now Patent No. 2,745,552, granted May 15, 1956.

In recent years liquid sodium has assumed importance as a heat exchange fluid for high temperature applications. A disadvantage has been the presence of sodium oxide in the liquid sodium. The most serious effect of excessive sodium oxide ($Na_2O$) is its solution deposition at lower temperature regions and hence its tendency to cause plugging. This plugging phenomenon is of utmost importance in the operation of sodium-cooled equipment due to the serious complications resulting from stoppage of small passages.

It is accordingly the object of this invention to provide an improved method for continuously removing sodium oxide from liquid sodium.

In pursuit of this objective, considerable research has been conducted and a number of approaches have been investigated and discarded as unsuitable for one reason or another. For example, distillation can be used, but the equipment required for this method is costly, complex and too cumbersome for use in a mobile unit.

Another method of removing sodium oxide employs gettering with calcium. However, this method is unsatisfactory because it leaves the system saturated with calcium metal. Upon later oxidation, calcium oxide will itself cause plugging which can not be relieved, by application of heat.

In view of the foregoing, studies have been made with a view to removing sodium oxide from sodium by cold trapping. This purification is accomplished by utilizing the differential solubility of sodium oxide in sodium as a function of temperature. Oxide removal can thus be achieved by cooling a by-pass stream of liquid sodium, promoting precipitation of the oxide impurities in excess of saturation, and removing the particles from the by-pass prior to returning to the main stream.

There are two most probable mechanisms for removal of the oxide by a cold trap. In the presence of sodium oxide crystals or other solid impurities, it is improbable that any degree of supersaturation can exist. Therefore, as the sodium stream is cooled below its oxide saturation temperature, the oxides are precipitated, either throughout the stream or preferentially on the cold surfaces. In this latter case, cold trapping can be considered essentially a surface phenomenon. Thus the effectiveness of oxide removal should be a function of the ratio of cold surface area to flow rate and of turbulence or flow characteristics as they affect the contact between the saturated stream and the cold surfaces.

Alternatively, it was deemed equally probable that oxide removal is accomplished by mechanical filtration. As sodium is cooled below its saturation temperature, oxide nuclei are produced throughout the stream. Crystal growth continues as the particles are carried along and finally the particles may be retained upon a mechanical filter. In this case, effectiveness of oxide removal would be a function of the relative size of the oxide particles and the filter passages, and to the opportunity for crystal growth prior to filtration.

In order to test the foregoing hypotheses, several cold traps were built which incorporated mechanical filters. The filters had an average pore size of about 5 microns. Filtration temperatures were held at approximately 350°–375° F. as compared with system temperatures of about 690°–760° F. Extensive experimentation with cold traps using metal filters revealed that such traps were in general unsatisfactory because of plugging. Indeed, in many instances a complete loss of flow was observed. This could not be entirely explained by the increase in sodium viscosity with decreased temperature, since at most this factor would have halved the flow rate. There was some evidence that plugging of the filters was due to crystal growth in the interstices of the filter itself. Based on this assumption, a study was made wherein the sodium stream was heated 5°–10° F. immediately ahead of the filters. Although the procedure prevented total plugging of the filter, it did not solve the problem since flow through the filter was observed to be uneven.

In a further effort to overcome plugging, the filter pore size was increased from 5 to 20 microns in one cold trap without improving the plugging behavior of the trap.

In view of the foregoing, cold traps employing porous metal filters were abandoned and work was shifted to cold traps packed with steel wool. In such cold traps the mechanism of removal is believed to be both oxide deposition on cold surfaces and oxide crystal growth on the steel wool. Oxide removal is maximized by control of the operating temperature and flow rates.

The method of this invention consists essentially in continuously removing sodium oxide from liquid sodium that comprises cooling a stream of sodium to a temperature at which the solubility of sodium oxide in sodium is substantially decreased. Thereafter the stream of sodium is contacted with stainless steel wool maintained at a temperature below that of the stream. The stream is kept in contact with the wool until the sodium contact is removed by crystal growth on the wool, reheating the stream and returning it to the system.

A cold trap for performing the method of this invention is shown in the accompanying drawings, wherein.

Figure 1:
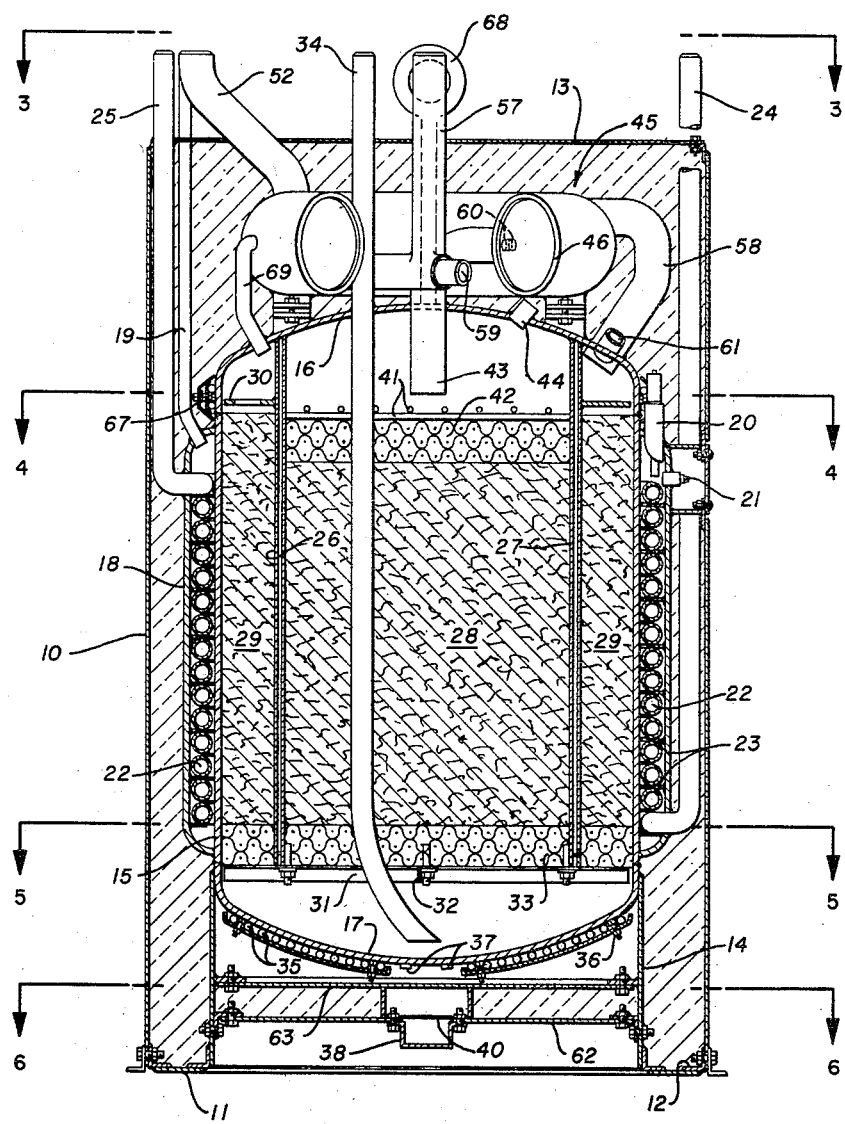
Fig. 1 is a cross section through the cold trap taken on a vertical plane.

With reference to Fig. 1, the trap comprises a vertical cylindrical insulation casing 10 mounted on a supporting ring 11 by means of suitable angle rings 12. A circular plate 13, penetrated by openings for equipment hereafter to be described, forms the top of the cold trap casing and provides support for junction boxes (not shown) required for the electrical equipment utilized in the cold trap.

A vertical cylindrical plate 14, concentric with the casing 10 and similarly attached to the ring 11 supports the cold trap shell or tank. This comprises a cylindrical section 15, closed top and bottom by dished plates 16, 17, a coolant jacket 18 is welded to the shell around the vertical section 15 thereof. The annular zone defined by the jacket 18 and the shell wall 15 is adapted to contain a fluid which enters the jacket through a fill pipe 19. An electrical contact liquid level probe 20 and a fluid jacket overflow tap 21 are provided for permitting accurate control of the liquid level in the jacket. The jacket also contains a cooling coil 22 supported at vertical intervals by brackets 23 welded to the jacket wall. The coil has an inlet pipe 24 which penetrates the jacket wall at the bottom and an outlet pipe 25 which enters the jacket wall adjacent the top thereof. The coil 22 is immersed in a third fluid in the jacket. This fluid serves to minimize contamination of the main liquid by leakage of cooling oil and vice versa. In addition the tertiary fluid serves as a leak detection device since a rise or fall in fluid level indicates a leak.

Figure 5:
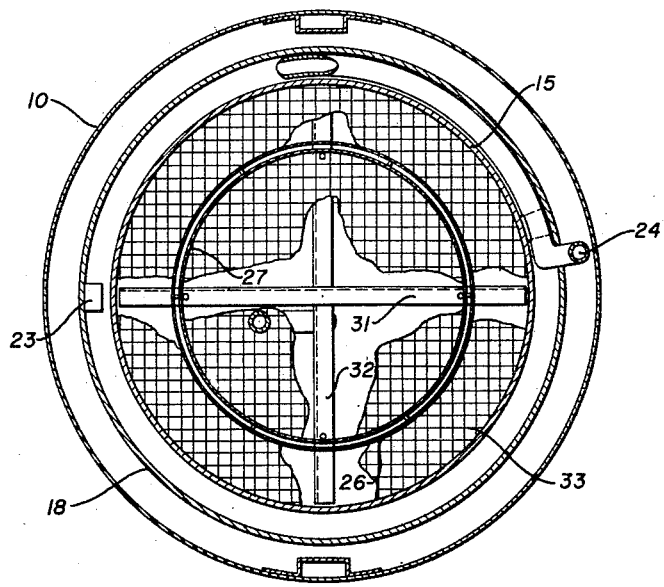
Fig. 5 is a cross section taken on line V—V of Fig. 1.

The interior of the trap is divided by a pair of coaxial cylindrical baffles 26, 27, which are welded to the top head 16 of the vessel and extend downwardly to the lower end of the vertical section 15 of the shell. The baffles thus divide the upper portion of the tank or shell into a central well or zone 28 and an annular zone 29 coaxial thereof. The upper end of the zone 29 is partitioned by a horizontal annular plate 30, welded to the baffle 26 and extending almost to the vessel shell. The partition plate 30 serves to distribute inflowing liquid sodium as will be described infra. The lower ends of baffles 26, 27 support a pair of crossed angle irons 31, 32 (Figs. 1 and 5). The latter retain mats of knitted stainless steel wire 33. In the present embodiment of the invention, these mats are approximately 2½ inches thick and have a free volume of approximately 90%.

The portion of the vessel below the angle irons 31, 32 contains only the outlet for drain pipe 34.

Figure 6:
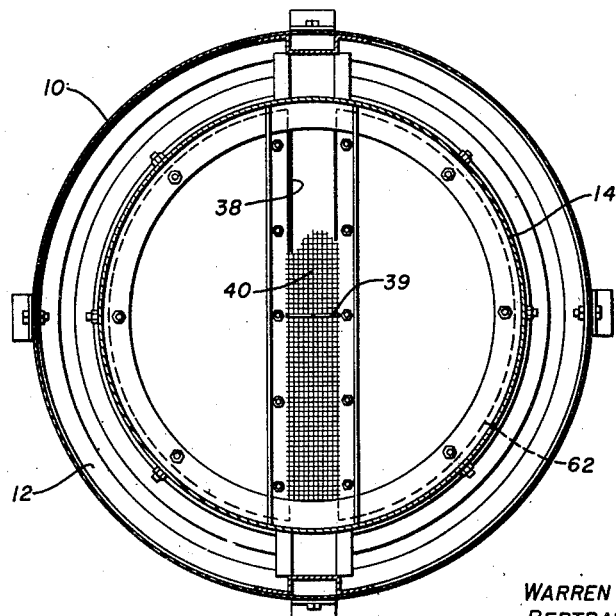
Fig. 6 is a cross section taken on line VI—VI of Fig. 1.

Electric heating coils 35 are secured to the exterior of the bottom shell plate 17 by clamps 36. The latter are welded directly to the plate 17. The heater 35 may be used to pre-heat the cold trap prior to initial filling with sodium. The heater may also be used to thaw sodium in the event that such fluid has frozen or otherwise solidified by misoperation or after use. Thermocouples 37 are located centrally of the plate 17. The leads for the thermocouples and for the heating coils 35 may be passed through a wire well 38 provided for that purpose. The wire well (Fig. 6) consists of a passage extending diametrically through the trap from one side of the insulating casing to the other. A partition 39, welded across the wire well, divides the latter into two sections which receive the thermocouple and heating wiring. An expanded metal grid 40 forms a removable cover for the wire well.

Figure 4:
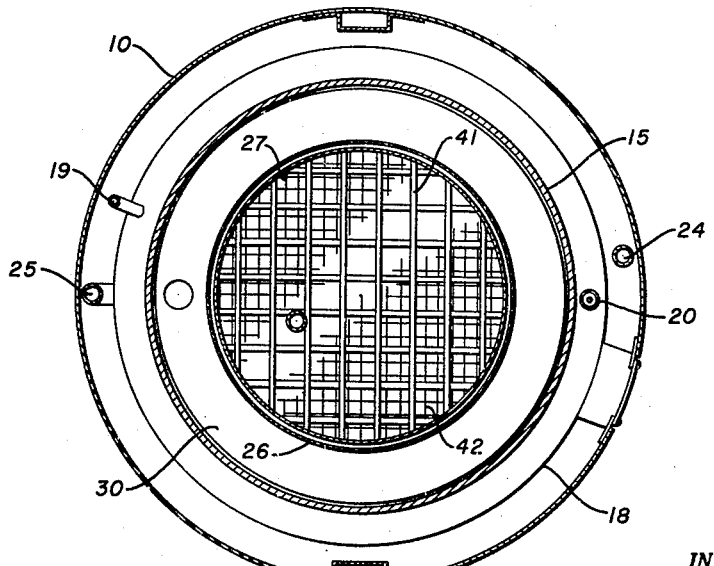
Fig. 4 is a cross section taken on line IV—IV of Fig. 1.

A coarse welded wire screen 41 is secured to the baffle 27 adjacent the upper portion of the central well 28 (Figs. 1 and 4). The screen serves to separate the upper portion of the cold trap from the woven wire mat 42 and the packed stainless steel wool in the zone 28. The region above the screen 41 contains the product outlet pipe 43 and a temperature indicator 44.

Figure 3:
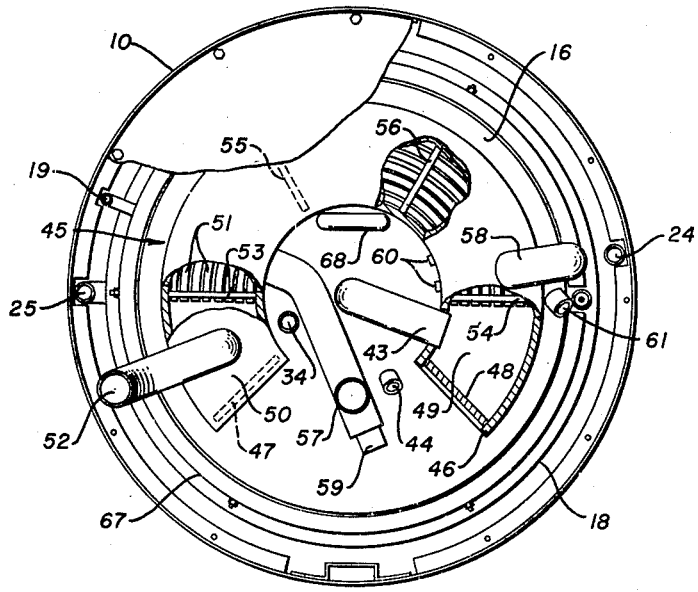
Fig. 3 is a cross section taken on line III—III of Fig. 1 with portions broken away.

The economizer 45 is located above and is supported by the top plate 16 of the vessel shell. As shown in Fig. 3, the economizer is essentially a heat exchanger for the inlet and outlet streams of liquid sodium. The economizer consists of a 270° annular section of pipe 46, closed by walls 47, 48. Segments of 49, 50 each occupying about 45° at either end of the pipe 46 are the heat exchanger headers and contain the connections for the outlet stream of liquid sodium. The latter enters the economizer through outlet pipe 43, passes through heat exchange tubes 51, into end segment 50 and then leaves the economizer through outlet 52.

The central 180° segment of the economizer is occupied by heat exchange tubes 51 held by the usual tube sheets 53 and 54 (Fig. 3). A pair of transverse baffles 55, 56 support the tubes and direct flow of the inlet sodium stream, which enters the economizer through inlet pipe 57 and leaves the same through pipe 58. A vent pipe 69 connects the economizer with the inlet section of the cold trap. Suitable temperature indicators are located at 59, 60, 61 in association with the economizer.

Figure 2:
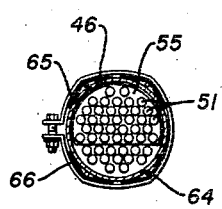
Fig. 2 is a cross section through the economizer.

As shown in Fig. 2, an electric heater 64, shielded by stainless steel shields 65, is clamped to the economizer at spaced intervals by heater clamp 66. Additional electric heating means 67 (Fig. 1) are clamped around the exterior of the vessel top plate.

An eyebolt 68 is provided for lifting the unit.

The cold trap is surrounded by rock wool type insulation. This fills the space between the cold trap and the insulation casing 10 on the sides of the unit. Insulation is also placed between the economizer and the casing on the top, and in the annular zone defined by plates 62, 63 at the bottom of the unit.

The interior of the vessel is filled with bulk stainless steel wool. It has been found that a density of about 25 pounds per cubic foot and a fiber diameter of about .022 inch give satisfactory results. The wool fills the annular zone 29 between the partition plate 30 and the wire mat 33. The central well 28 is likewise filled with steel wool between the upper and lower wire mats 42 and 33.

In operation, liquid sodium at a temperature of approximately 750° F. is pumped into the cold trap through the inlet pipe 57, which communicates with the shell side of the economizer adjacent to the lower portions thereof. The incoming sodium flows around the tubes 51, thereby cooling the incoming liquid and heating the outgoing liquid within the tubes. The sodium then leaves the economizer through pipe 58, which delivers the sodium to that portion of the annular zone 29 above the partition plate 30. The plate distributes the incoming sodium, which then flows downwardly through the zone 29. Subsequently the sodium flows around the lower end of the vertical baffles 26, 27, and then upwardly through the well 28, outlet pipe 43, economizer tubes 51 and outlet 52 which returns the sodium to the system.

The lower operating temperature of most sodium systems is greater than 350° F. Hence, to avoid oxide plugging difficulties it is sufficient if the oxide content is maintained at a figure corresponding approximately to the saturation figure at approximately 350° F.

In the preferred method, sodium enters the economizer at about 750° F. and is cooled to approximately 400° F. therein. The sodium is further cooled to about 350° F. in the cold trap due to the action of cooling fluid in cooling coil 22, and the sodium is reheated to approximately 700° F. in the economizer before returning to the system. The steel wool in the cold trap promotes nucleation of sodium oxide and serves as support for the crystals. The wool further serves as a filter for removing large solid objects in the liquid stream such as scale, weld slag and the like. Holdup time in the cooled steel wool zone is five minutes at a rated flow of 7500 pounds per hour, which is equivalent to 20 gallons per minute.

It has been found experimentally that a holdup time of five minutes is optimum. By studying the number of system turnovers required to reduce the oxide content to saturation at the cold trap temperature, it was discovered that a holdup time of 10 minutes was of little advantage over a 5 minute holdup. However, as the holdup time is decreased to 2.5 minutes the efficiency of each pass through the trap is markedly poorer.

Extensive life tests have been conducted with a cold trap of the present type. These tests involve the addition of oxide to liquid sodium in the form of sodium peroxide or sodium monoxide, analysis of the oxygen content of the liquid sodium is made following cold trapping. In one such test oxygen was added until the sodium oxide capacity of the trap reached 22.7 weight percent without any detectable pressure drop across the cold trap. The present device and method have thus completely solved the problem of plugging, which disqualified cold traps employing porous metal filters. It has also been demonstrated to be superior to traps without steel wool which rely solely upon deposition on cold surfaces rather than nucleation growth for oxide removal.

We claim:

1. The method of continuously removing sodium oxide from a system containing high temperature liquid sodium that comprises cooling a stream of sodium to a temperature at which the solubility of sodium oxide in sodium is substantially decreased, contacting the stream with stainless steel wool, maintaining the stream in contact with the wool until sodium oxide is removed by crystal growth on the wool, reheating the stream and returning it to the system.

2. The method of continuously removing sodium oxide from a system containing high temperature liquid sodium that comprises cooling a stream of liquid sodium to a temperature of approximately 400° F., contacting the cooled sodium with stainless steel wool, maintaining the sodium in contact with the stainless steel wool until sodium oxide crystals form thereon, reheating the sodium and returning it to the system.

3. The method of continuously removing sodium oxide from a system containing high temperature liquid sodium that comprises cooling a stream of liquid sodium to a temperature of approximately 400° F. to decrease the solubility of sodium oxide in the liquid sodium, contacting the cooled stream with stainless steel wool maintained at a temperature approximately 40° F. to 50° F. below that of the cooled stream maintaining the stream in contact with the steel wool until excess sodium oxide is removed by crystal growth on the steel wool, reheating the stream and returning it to the system.

4. The method of continuously removing sodium oxide from a system containing liquid sodium at temperatures in the range of 750° F. that comprises cooling a stream of liquid sodium to a temperature of approximately 400° F. to decrease the solubility of sodium oxide in the sodium, contacting the cooled stream with stainless steel wool maintained at a temperature approximately 40° F to 50° F. below that of the cooled stream, maintaining the stream in contact with the wool for approximately five minutes whereby sodium oxide is removed by crystal growth on the wool, reheating the stream and returning it to the system.

References Cited in the file of this patent

UNITED STATES PATENTS 1,937,757    Gleason _____ Dec. 5, 1933

OTHER REFERENCES

"Mechanical Engineering," vol. 75, June 1953, pages 472–476. Copy in Scientific Library.